United States Patent [19]

Hutter

[11] Patent Number: 5,180,424
[45] Date of Patent: Jan. 19, 1993

[54] MICHAEL ADDITION AMINOPOLYESTER RESINS AS DILUTION EXTENDERS FOR ZINC-CONTAINING METAL RESINATE INKS

[75] Inventor: G. Frederick Hutter, Charleston, S.C.

[73] Assignee: Westvaco Corporation, New York, N.Y.

[21] Appl. No.: 884,916

[22] Filed: May 18, 1992

Related U.S. Application Data

[62] Division of Ser. No. 772,228, Oct. 7, 1991, abandoned.

[51] Int. Cl.$^5$ ............................................. C09D 11/00
[52] U.S. Cl. ........................ 106/20 R; 106/30 C; 106/499; 106/500; 524/272; 525/437; 526/304; 526/310; 526/312; 528/332; 528/335; 528/345
[58] Field of Search ............... 106/20, 23, 30, 499, 106/500; 524/272; 526/309, 312, 310; 525/437; 528/272, 281, 291, 350, 353, 332, 335, 345

[56] References Cited

U.S. PATENT DOCUMENTS

| | | | |
|---|---|---|---|
| 2,610,180 | 9/1952 | Klug | 260/231 |
| 3,468,829 | 9/1969 | Yoshioka et al. | 260/27 |
| 4,180,632 | 12/1979 | Ilenda | 521/184 |
| 4,265,966 | 5/1981 | Schuh | 428/324 |
| 4,341,676 | 7/1982 | Patricca et al. | 523/417 |
| 4,528,036 | 7/1985 | Rudolphy | 106/30 |
| 4,552,592 | 11/1985 | Rudolphy et al. | 106/30 |
| 4,566,997 | 1/1986 | Satoh et al. | 530/214 |
| 4,644,036 | 2/1987 | Walz et al. | 525/386 |
| 4,675,374 | 6/1987 | Nichols | 528/119 |
| 4,767,835 | 8/1988 | Janusz | 527/600 |
| 4,786,682 | 11/1988 | Perez et al. | 525/28 |
| 4,990,187 | 2/1991 | Dien et al. | 106/30 |
| 5,000,792 | 3/1991 | Ohta et al. | 106/499 |
| 5,085,699 | 2/1992 | Hutter | 106/30 |
| 5,098,479 | 3/1992 | Hutter | 106/30 |

Primary Examiner—John Kight, III
Assistant Examiner—Richard Jones
Attorney, Agent, or Firm—Daniel B. Reece, IV; Terry B. McDaniel; Richard L. Schmalz

[57] ABSTRACT

The invention is a printing ink comprising a zinc-containing metal resinate complexed with aminopolyester resins and the process for preparing them. In particular, the invention relates to aminopolyester resins having properties which make them useful as resinate dilution extenders in formulating vehicles for gravure and intaglio printing inks.

5 Claims, No Drawings

MICHAEL ADDITION AMINOPOLYESTER RESINS AS DILUTION EXTENDERS FOR ZINC-CONTAINING METAL RESINATE INKS

This is a division of application Ser. No. 07/772,228, filed Oct. 7, 1991, now abandoned.

FIELD OF INVENTION

The invention relates to novel aminopolyester resins and the process for preparing them. In particular, the invention relates to aminopolyester resins having properties which make them useful as resinate dilution extenders in formulating vehicles for gravure and intaglio printing inks.

BACKGROUND OF THE INVENTION

The high acid values common in rosins utilized to make ink resins can be lowered by reacting the rosins with zinc oxide, calcium acetate, or similar compounds to produce metallic resinates. Metal resinates are widely used as binders in gravure printing inks due to their rapid solvent release and their ability to prevent some basic pigments from livering. These resinates are soluble in hydrocarbons, but not in alcohol. One of the shortcomings of using metal resinates in gravure inks has been their low solution viscosities, a byproduct of their low molecular weights. These low viscosities make it difficult to formulate inks having the desired pigment-to-binder ratios at press viscosities that are necessary for this type of printing.

Another critical property of metal resinate solutions that is directly linked to viscosity is dilutability. Viscosity is measured by the time required for an exact quantity of solution to flow by gravity through a specially sized apparatus. Dilutability is measured by the amount of solvent needed to reduce the viscosity of a given weight of resinate solution to a certain level. The typical specification for a metal resinate solution calls for the volume of toluene needed to reduce 100 grams of resinate to an 18 second flow as measured with a #2 Shell cup.

The usual dilutability values of commercial resinates are between 70 to 120 ml. Ink makers would like dilutability values higher than this in order to achieve a desirable balance of solids, color strength, and viscosity in finished inks.

To solve these problems of viscosity and dilutability with metal resinate formulations, ink makers traditionally have added small amounts of ethylcellulose or ethylhdroxyethyl-cellulose (EHEC) to the ink as a thickener (the properties of which are discussed in U.S. Pat. No. 2,610,180). EHEC owes its thickening ability to three factors: (a) a very high molecular weight, (b) a rigid molecular structure, and (c) intermolecular association via hydrogen bonding of unetherified hydroxyl groups on the cellulose backbone. These factors permit EHEC to be used to produce a drastic reduction in resin solids at press viscosity (expressed in the industry as a "high dilution").

However, using EHEC as a thickener gives rise to other problems, as described in Leach, R. H., The Printing Ink Manual, Van Nostrand Reinhold Co. Ltd., London, 1988. Very small amounts of EHEC can cause substantial reductions in the gloss of an ink. Also, the cost of EHEC is relatively expensive. Finally, EHEC is only marginally compatible with metal resinates. This incompatibility seems to vary from batch to batch, and may manifest itself in phase separation of the ink upon standing.

Attempts have been made to eliminate those problems with EHEC by producing other ink thickeners. It is known to prepare printing ink binders based on reaction products of (a) natural resins, (b) other synthetic resins (for example hydrocarbon resins having a bromine number of 5 to 80), and (c) calcium compounds (and, if appropriate, other compounds of group II of the periodic system). In this process an unsaturated dicarboxylic acid (i.e., maleic anhydride) is reacted at the same time. This method, taught in U.S. Pat. No. 3,468,829, has a disadvantage in that the resulting viscous products are virtually not utilizable as printing ink binders.

Other known binders are taught in U.S. Pat. No. 4,528,036 and U.S. Pat. No. 4,552,592. Here, the binders are based on the reaction products of (a) natural resins, (b) a copolymer or a synthetic resin and (c) calcium compounds. The resulting reaction products are reacted subsequently with acetic acid to form a salt of the corresponding resin. These solutions are of relatively low molecular weights and viscosities.

Yet another known binder is the product complex formed by reaction of a metal resinate and an amine-reactive polyamide as taught in U.S. Pat. No. 4,767,835. The amine-reactive polyamide, being a condensation polymer, is of comparatively low molecular weight.

A nitrogen-zinc complexing dilution enhancer is taught in the commonly assigned U.S. Pat. No. 5,098,479. This patent teaches that resinate dilutability can be substantially enhanced by the use of small amounts of acrylic polymers containing pendant amine groups. These amine groups form coordinate complexes with the zinc ions present in the resinate. These formed complexes create a higher apparent molecular weight which provides higher viscosities to the resinate, thereby allowing desired dilution of the inks with solvent prior to printing. When evaluated against EHEC, the disclosed aminoacrylate resins were comparable in thickening ability and did not produce the gloss reduction problems associated with the use of EHEC. However, these resins have proven to be more difficult to blend with resinates than EHEC due to gel formation that can be reduced only by vigorous agitation.

Another dilution enhancer which employs a nitrogen-zinc complex mechanism similar to the one operative herein is taught in the commonly assigned U.S. Pat. No. 5,085,699. This patent teaches the use of aminopolyester resins prepared by condensing aminopolyols and polycarboxylic acids as dilution extenders for zinc-containing metal resinates.

However, the present invention differs from this patent in several important aspects. The patent teaches the use of the reaction products (aminopolyesters) of condensation reactions between certain aminopolyols and polycarboxylic acids. These aminopolyesters can be represented by the following chemical structure:

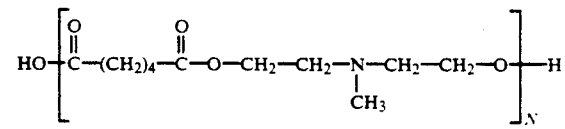

As the above structure shows, the polymer repeating unit is comprised of two esters and one amine. The present invention teaches the use of the Michael addition reaction products (aminopolyesters) between certain polyacrylic esters and polyamines. These aminopolyesters can be represented by the following chemical structure:

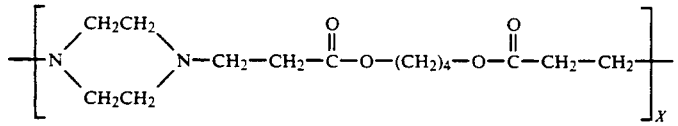

Here, the polymer repeating unit is comprised of two amines and two esters.

The Michael addition products are similar to the condensation products in their dilution enhancement and effect on ink gloss and color strength. However, they are much lighter in color than the condensation resins (i.e., the addition resin measures about a 3 on the Gardner Color Scale compared to a 15 for the condensation resin). This characteristic allows the addition resins to be utilized to formulate lighter-colored inks (for which the darker condensation resins are unsuitable). Also, certain addition aminopolyester resins show enhanced solubility in toluene when compared to condensation resins.

Therefore, it is the object of this invention to produce an economical thickener of a high molecular weight and high dilutability, which exhibits an enhanced compatibility with the metal resinates commonly utilized in gravure printing inks.

SUMMARY OF THE INVENTION

This objective is achieved by reaction of the metal ions present in the resinate solution to form a complex with a high molecular weight polyester containing multiple amine groups. That is, nitrogen present in the aminopolyester resin complexes with the metal ions (particularly the zinc ions) present in the resinate solution to form the dilution extender.

Suitable aminopolyester resins are prepared via the Michael addition of polyamines and polyfunctional acrylic esters. A wide range of polyamines and acrylic esters can be used in this reaction to produce either linear aminopolyesters or branched aminopolyesters, depending upon the requirements of the user. This ability to specifically tailor resinate dilution extenders to meet exact needs will greatly aid ink formulators in producing vehicles for intaglio and gravure printing inks.

DESCRIPTION OF THE PREFERRED EMBODIMENT

The invention that is useful as a thickener in publication gravure inks is prepared by reacting a metal resinate with an aminopolyester resin in solution.

Suitable metal resinates must include zinc, and may include other compounds of group II of the periodic system, either alone or in combination with rosin, phenolated rosin, polymerized rosin, maleated rosin, fumarated rosin, and the like, and their mixtures. The rosin may be derived from tall oil rosin, wood rosin, or gum rosin.

Solvents suitable for use in the reaction include aliphatic and aromatic hydrocarbons.

It is known to skilled artisans that primary or secondary amines will add across the double bond of acrylic acid (or its esters) as represented in Equation 1 below.

Equation 1

This is commonly called a Michael addition (and for the purposes of this application will be referred to as such, although this term, strictly speaking, applies only to a similar addition by a carbanion).

It has been found that a wide range of aminopolyesters could be prepared from the addition reaction of polyamines and acrylic esters. A series of representative examples are given in Table I (see p. 11-12). Both linear and branched molecules can be prepared, and both types are effective as dilution extenders.

Polyamines which are suitable for use in the addition reaction include, but are not limited to, the following:
aminoethylpiperazine
1,2-diaminocyclohexane
3-dimethylaminopropylamine
N,N'-dimethylethylenediamine
2-methyl-1,5-pentanediamine
ethylenediamine
isophoronediamine
bis(4-aminocyclohexyl)methane,
and
piperazine.

Acrylic esters which are suitable for use in the addition reaction include, but are not limited to, the following:
hexanediol diacrylate
trimethylolpropane triacrylate, and
tripropylene glycol diacrylate.

Hexanediol diacrylate (a preferred diacrylate) was used in many of the examples because it has the shortest chain length of the commercially available diacrylates. A low molecular-weight diacrylate allows the preparation of polymers with correspondingly low equivalent weights per nitrogen atom. Maximization of nitrogen content is desirable since the thickening mechanism of these resins involves the complexation of the amine groups with the zinc in the resinate. With the linear condensation aminopolyesters taught in the commonly assigned U.S. Pat. No. 5,085,699, it was found that resins with amine equivalent weights lower than about 250 were either insoluble in toluene or incompatible with JONREZ® MR-560. (JONREZ® MR-560 is a toluene-soluble calcium/zinc resinate solution used for gravure inks, sold by Westvaco Corporation.) By contrast, almost all of the Michael addition aminopolyesters shown in Table I have equivalent weights below this number and are both soluble and compatible. In the Michael addition process, the ratio of the reactants is such that the equivalent weight of primary and/or secondary amine per the equivalent weight of acrylic unsaturation is in the range of 0.8-1.4; with the preferred range being from 1.0-1.1. The addition polymers give, in general, the higher dilution values that would be expected on the basis of their higher amine contents (resins numbers 3 and 5 being exceptions due to their marginal compatibility).

The reason for the poorer solubility of the condensation polymers is probably the presence of carboxyl groups. To keep reaction times reasonable, the condensation (esterification) reactions were discontinued when the acid number of the resin reached about 10-20. The presence of this acid functionality would allow the formation of inner salts with the amine groups, which would in turn decrease the solubility in nonpolar solvents, such as toluene. This problem does not arise with an addition polymer, whose acid number is essentially zero.

Exceptions to the high toluene solubility of Michael addition polymers are those made with highly symmetrical primary diamines. Reaction of hexanediol diacrylate with 1,8-diaminooctane, 1,12-diaminododecane, 1,4-diaminocyclohexane, or 1,4-phenylenediamine resulted in toluene-insoluble resins. Bis(4-aminocyclohexyl)methane, a symmetrical, but rather bulky diamine, gave a soluble product (resin number 7), but its compatibility with the resinate was limited. This behavior is probably due to a high degree of crystallinity in the polymer as a result of a combination of linearity and hydrogen bonding due to N-H groups. Resins made with secondary amines, such as piperazine (resin number 1), are readily soluble in toluene, as are those from asymmetrical primary amines, such as isophoronediamine (resin number 8), and mixed primary-secondary amines, such as aminoethylpiperazine (resin number 4). Even the pendant methyl group of DYTEK A provides sufficient asymmetry to produce a resin with at least partial toluene solubility. (DYTEK A ® is a commercial grade 2-methyl-1, 5-pentanediamine manufactured by duPont, Inc.)

The Michael addition aminopolyesters were prepared in toluene solutions. Since the reaction is highly exothermic in most cases, solvent is needed as a heat sink. In the case of toluene insoluble intermediates (such as piperazine) the material dissolves slowly as the reaction proceeds. Limiting the temperature to that of refluxing toluene (110°-115° C.) gives the added advantage of improved color. The condensation products, which are processed at 200° C., are considerably darker than the Michael addition products.

In the case of polymers from primary amines, which contain secondary amine groups in their backbones, one might expect further reaction with acrylate groups to produce chain branching. Indeed, one might even postulate the formation of a linear polymer from a monofunctional primary amine and a diacrylate as shown in Equation 2 below.

Equation 2

However, these reactions do not take place at the reflux temperature of toluene, probably due to steric effects. No gelation is observed with primary diamines and diacrylates. Gelation would be expected if there were substantial chain branching. Furthermore, reaction of n-butylamine and hexanediol diacrylate in refluxing toluene for eight hours produced no polymer. Higher temperatures (possibly under pressure) would probably introduce side reactions such as ester aminolysis that would produce unacceptable products.

If desired, a controlled amount of chain branching can be introduced by the use of polyfunctional (f>2) amines or acrylates (as shown in resins number 10 and 11, which contain a triacrylate). In a similar way, molecular weight can be controlled with a monofunctional reactant, such as the morpholine in resin 10. Those skilled in the art can use the above options to tailor the aminopolyester to meet specific ink formulation needs.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

To a stirred slurry of 21.5 g of piperazine in 138.7 g of toluene in a 500 ml flask was added 56.5 g of hexanediol diacrylate drop-wise over 15 minutes, during which time the reaction exothermed to 42° C. The piperazine dissolved as it reacted with the acrylate. The solution was then refluxed for four hours to give a clear 36% solids solution with a Gardner-Holt viscosity of A.

A dilution comparison was made between this aminopolyester resin (hereafter referred to as resin number 1) and EHEC utilizing the resinate solution JONREZ ® MR-560. (JONREZ MR-560 is a toluene-soluble calcium/zinc resinate solution used for gravure inks, sold by Westvaco Corporation.) Dilutions were run by taking 100 g of the resinate or resinate/polyester blend and measuring the number of milliliters of toluene required to obtain a viscosity of 18 seconds with a #2 Shell cup. Here, the MR-560 control dilution was 100; and the percentages represent dry:dry ratios of aminopolyester resin to resinate.

As stated earlier, the usual dilutability values of commercial resinates are between 70 and 120. At 0.9%, EHEC measured 130 to the invention aminopolyester resin's 120. At 1.8%, both EHEC and the resin measured 170. At 3.6%, EHEC measured 245 to the resin's 265. Thus, the ability of the invention to enhance dilutability compared favorably with EHEC—especially when one takes into account that EHEC is more expensive than the aminopolyester resin.

EXAMPLE 2

A series of aminopolyester resins of differing compositions were produced via the Michael addition method taught in Example 1. Subsequent dilution comparisons were made between the resulting resins and EHEC in the same manner outlined in Example 1.

TABLE I

| | Michael Addition Aminopolyesters | | | | |
|---|---|---|---|---|---|
| Resin | | Wgt.[a] | Dilution (%)[b] | | |
| No. | Composition | Per Nitrogen | 0.9 | 1.8 | 3.6 |
| 1 | 72.4 HDODA | 156 | 120 | 170 | 265 |
| | 27.6 Pip | | | | |

TABLE I-continued

| Resin No. | Michael Addition Aminopolyesters Composition | Wgt.[a] Per Nitrogen | Dilution (%)[b] 0.9 | 1.8 | 3.6 |
|---|---|---|---|---|---|
| 2 | 72.0 HDODA 28.0 DMEDA | 157 | 100 | 135 | 200 |
| 3 | 63.9 HDODA 36.1 DYTEK A | 161 | 120 | 120 | 155[c] |
| 4 | 62.5 HDODA 37.5 AEP | 115 | 160 | 225 | — |
| 5 | 82.0 TPGDA 18.0 EDA | 166 | 105 | 155 | 125[d] |
| 6 | 65.4 HDODA 34.6 1,2-DACH | 165 | 140 | 200 | 330 |
| 7 | 50.6 HDODA 49.4 PACM-20 | 231 | 160 | 180 | [e] |
| 8 | 55.9 HDODA 44.1 IPDA | 193 | 120 | 150 | 240 |
| 9 | 50.6 HDODA 49.4 APMPA | 223 | 125 | 155 | 250 |
| 10 | 45.4 HDODA 19.8 TMPTA 17.3 Pip 17.5 Mor | 165 | 110 | 130 | 170 |
| 11 | 44.1 HDODA 19.2 TMPTA 16.8 Pip 19.9 DMAPA | 128 | 130 | 170 | 275 |
| 12 | 77.3 S2000 22.7 DYTEK A | 255 | 125 | 175 | 235 |
| 13 | 42.7 HDODA 22.4 TMPTA 19.5 Pip 15.4 DMAPA | 132 | 120 | 170 | 285 |
| 14 | 48.4 HDODA 51.6 JD230 | 223 | 130 | 165 | 290 |
| 15 | 27.2 HDODA 72.8 K3695 | 416 | 140 | 210 | — |
| Control | — EHEC | — | 130 | 170 | 245 |

Notes:
[a]Equivalent weight per nitrogen atom.
[b]Weight of additive based on MR-560 resinate (solids basis); value for control is 100.
[c]Solutions hazy (partially incompatible)
[d]Precipitate forms on standing for several days.
[e]Incompatible.
AEP: Aminoethylpiperazine.
APMPA: A mixed polycyclic aliphatic and aromatic polyamine product made by Air Products with an amine equivalent weight of 109.
1,2-DACH: 1,2-diaminocyclohexane.
DMAPA: 3-dimethylaminopropylamine.
DMEDA: N,N'-dimethylethylenediamine.
DYTEK A: Commercial grade 2-methyl-1,5-pentanediamine from DuPont.
EDA: Ethylenediamine.
HDODA: Hexanediol diacrylate.
IPDA: Isophoronediamine.
JD230: JEFFAMINE D-230 (a primary amine terminated polyether from Texaco).
K3695: KEMAMINE 3695 (a dimer diamine from Witco).
Mor: Morpholine.
PACM-20: A commercial grade of bis(4-aminocyclohexyl) methane from Air Products.
Pip: Piperazine.
S2000: A diacrylate of a $C_{14-15}$ diol from Sartomer.
TMPTA: Trimethylolpropane triacrylate.
TPGDA: Tripropylene glycol diacrylate.

While the compositions shown in Table I by no means exhaust all of the possibilities of this chemistry, they are of a sufficient variety to draw correlations between structure and dilution enhancement.

The results in Table I illustrate that a wide variety of branched aminopolyesters (resins 10, 11, and 13) and linear aminopolyesters may be produced which compare favorably with EHEC in both dilution enhancement and cost.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A printing ink comprising a zinc-containing metal resinate complexed with an aminopolyester that is soluble in either aliphatic or aromatic hydrocarbons; said aminopolyester being prepared as the Michael addition reaction product of:
   (a) a polyamine wherein the polyamine is a member selected from the group consisting of aminoethylpiperazine, 1,2-diaminocyclohexane, 3-dimethylaminopropylamine, N,N$^1$-dimethylethylenediamine, 2-methyl-1,5-pentanediamine, ethylenediamine, isophoronediamine, bis(4-aminocyclohexyl) methane, piperazine, and combinations thereof; and
   (b) an acrylic ester wherein the acrylic ester is a member selected from the group consisting of hexanediol diacrylate, trimethylolpropane triacrylate, tripropylene glycol diacrylate, and combinations thereof;
where the ratio of the reactants is such that the equivalent weight of the primary and secondary amine groups per the equivalent weight of acrylic unsaturation is in the range of 0.8–1.4.

2. The resinate of claim 1 wherein the zinc-containing metal resinate also includes calcium, magnesium, or a mixture thereof.

3. A printing ink comprising the metal resinate of claim 1 dissolved in a hydrocarbon solvent and pigment dispersed therein.

4. A printing ink comprising the metal resinate of claim 2 dissolved in a hydrocarbon solvent and pigment dispersed therein.

5. The complexed metal resinate of claim 1 wherein the ratio of the said reactants utilized to produce said aminopolyester is such that the equivalent weight of the primary and secondary amine groups per the equivalent weight of acrylic unsaturation is in the range of 1.0–1.1.

* * * * *